(12) United States Patent
Mulligan

(10) Patent No.: US 9,098,969 B2
(45) Date of Patent: Aug. 4, 2015

(54) INTERCHANGEABLE GAMING LAYOUT POWERED BY A DISPLAY ELEMENT

(71) Applicant: Timothy Mulligan, Edwardsville, PA (US)

(72) Inventor: Timothy Mulligan, Edwardsville, PA (US)

( * ) Notice: Subject to any disclaimer, the term of this patent is extended or adjusted under 35 U.S.C. 154(b) by 0 days.

(21) Appl. No.: 14/308,694

(22) Filed: Jun. 18, 2014

(65) Prior Publication Data

US 2014/0378199 A1 Dec. 25, 2014

Related U.S. Application Data

(60) Provisional application No. 61/976,230, filed on Apr. 7, 2014, provisional application No. 61/837,321, filed on Jun. 20, 2013.

(51) Int. Cl.
*A63F 11/00* (2006.01)
*G07F 17/32* (2006.01)

(52) U.S. Cl.
CPC .......... *G07F 17/322* (2013.01); *G07F 17/3293* (2013.01)

(58) Field of Classification Search
CPC  A63F 1/06; A63F 2300/00164; G07F 17/322
USPC ........................... 463/12, 13; 273/148 R, 309
See application file for complete search history.

(56) References Cited

U.S. PATENT DOCUMENTS

| | | | | |
|---|---|---|---|---|
| 2,113,049 | A * | 4/1938 | Holland | 273/309 |
| 5,429,361 | A * | 7/1995 | Raven et al. | 463/25 |
| 6,126,166 | A * | 10/2000 | Lorson et al. | 273/148 R |
| 2004/0160005 | A1* | 8/2004 | Krise et al. | 273/274 |
| 2006/0068870 | A1* | 3/2006 | Crawford et al. | 463/13 |
| 2007/0045959 | A1* | 3/2007 | Soltys | 273/274 |
| 2007/0135193 | A1* | 6/2007 | Nicely | 463/11 |
| 2007/0145682 | A1* | 6/2007 | Rowe et al. | 273/148 R |
| 2009/0108532 | A1* | 4/2009 | Darling | 273/309 |
| 2011/0115158 | A1* | 5/2011 | Gagner et al. | 273/274 |
| 2014/0191474 | A1* | 7/2014 | van Linden | 273/309 |

FOREIGN PATENT DOCUMENTS

WO    WO2014140512 A1    9/2014

* cited by examiner

*Primary Examiner* — Allen Chan
(74) *Attorney, Agent, or Firm* — James M Smedley LLC; James M. Smedley, Esq.

(57) ABSTRACT

The present invention generally relates to an interchangeable gaming layout powered by a display element that shows the background graphics and table layouts of a gaming table. Specifically, embodiments of the present invention are configured to provide the background graphics and table layout for a gaming table that is presented by a full color display element and is conveniently reconfigurable between games without requiring the entire gaming table and/or layout to be resurfaced. Further embodiments of the present invention are configured to allow for the gaming table and/or layout to provide content (e.g., multimedia content) during downtime or other intermission periods in game play.

15 Claims, 7 Drawing Sheets

INTERCHANGEABLE GAMING LAYOUT POWERED BY A DISPLAY ELEMENT

CROSS-REFERENCE TO RELATED APPLICATIONS

This application claims the benefit of U.S. Provisional Patent Application No. 61/976,230, filed Apr. 7, 2014 and entitled "Interchangeable Gaming Layout Powered by a Display Element" the entire disclosure of which is incorporated herein by reference.

This application claims the benefit of U.S. Provisional Patent Application No. 61/837,321, filed Jun. 20, 2013 and entitled "Interchangeable Gaming Layout Powered by LEDs via a Computer Program" the entire disclosure of which is incorporated herein by reference.

FIELD OF THE INVENTION

The present invention generally relates to an interchangeable gaming layout powered by a display element that shows the background graphics and table layouts of a gaming table. Specifically, embodiments of the present invention are configured to provide the background graphics and table layout for a gaming table that is presented by a full color display element and is conveniently reconfigurable between games without requiring the entire gaming table and/or layout to be resurfaced. Further embodiments of the present invention are configured to allow for the gaming table and/or layout to provide content (e.g., multimedia content) during downtime or other intermission periods in game play.

BACKGROUND OF THE INVENTION

When a casino wants to change a game layout to another game it first requires all the gaming value cheques to be removed. Then the maintenance department has to be called and physically remove the layout. A fresh new layout is then used and installed onto the table surface. Once that is finished then the table must have value cheques put back onto the table to resume gaming. This work in total is a few hours of labor per table. The result is vast expenditures or resources, both in terms of labor and money, in order to switch out table surfaces.

The layouts currently used in the field are printed on physical felt and can only be used in one specific game. These layouts take hours to change and it is not worth the casinos trouble to change games back and forth due to business demands. Since most casinos are open 24/7, having a table off of the casino floor for any amount of time results in lost revenues.

Therefore, there is need in the art for an interchangeable gaming layout powered by a display element, configured to provide a gaming table/layout system that does not require the changing of the felt or other gaming elements every time a casino wants to change the casino game. These and other features and advantages of the present invention will be explained and will become obvious to one skilled in the art through the summary of the invention that follows.

SUMMARY OF THE INVENTION

Accordingly, it is an object of the present invention to provide a system and method for an interchangeable gaming table layout and background graphics that allows for a casino or other game operator to quickly and easily change between different types of games depending upon the needs of the casino or other game operator.

According to an embodiment of the present invention, a system for an interchangeable gaming layout, the system comprising: a display element communicatively connected to a processing element, a storage medium configured to store software elements, wherein the software elements are computer executable code stored in non-volatile memory that control the display of one or more types of multimedia content and are executable by the processing element to direct what is displayed on the display element, and a surface material configured to replicate one or more physical characteristics of a gaming table surface.

According to an embodiment of the present invention, the display element is formed as a top of a gaming table.

According to an embodiment of the present invention, a gaming table is selected from a group of gaming tables comprising poker tables, baccarat tables, blackjack tables, craps tables, board games, non-standard tables, and custom tables.

According to an embodiment of the present invention, the display element may be configured to display a plurality of graphics items selected from a group of graphics items comprising, table layouts, player positions, logos, backgrounds, and advertisements.

According to an embodiment of the present invention, the display element is a dot matrix LED display positioned below surface material.

According to an embodiment of the present invention, the display element is an OLED display positioned over top of the surface material.

According to an embodiment of the present invention, the surface material is made of a sufficiently translucent material to permit light and multimedia content from the display element to be transmitted through the surface material.

According to an embodiment of the present invention, the surface material is a substantially translucent fabric material.

According to an embodiment of the present invention, light from the display element is projected on to and transmitted through the surface material.

According to an embodiment of the present invention, the one or more types of multimedia content are selected from a plurality of multimedia types comprising a plurality of games, advertising content, personalized content, video content, betting information, table rules, and side games.

According to an embodiment of the present invention, the one or more physical characteristics are a plurality of table surface characteristics comprising flexibility, padding level, surface friction, visual appearance, and tactile feel.

According to an embodiment of the present invention, the system is further comprised of one or more gaming elements attached to the interchangeable gaming layout, wherein the one or more gaming elements are selected from a group of gaming elements comprising card discard racks, card shoes, dice holders, and chip holders.

According to an embodiment of the present invention, the system is further comprised of one or more securing means configured to reversibly attach the one or more gaming elements to the interchangeable gaming layout, wherein the one or more securing means are selected from a group of securing means comprising screws, nuts, bolts, clips, magnets, and pins.

According to an embodiment of the present invention, the system is further comprised of a multi-compartment drop box configured to provide a plurality of separate holding compartments for monies received form a plurality of different game types.

According to an embodiment of the present invention, the system is further comprised of a protective layer that is positioned over top of the display element to protect the display element from damage.

According to an embodiment of the present invention, the protective layer includes a padded layer that replicates said one or more physical characteristics of a gaming table surface.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to an interchangeable gaming layout powered by a display element that shows the background graphics and table layouts of a gaming table. Specifically, embodiments of the present invention are configured to provide the background graphics and table layout for a gaming table that is presented by a full color display element and is conveniently reconfigurable between games without requiring the entire gaming table and/or layout to be resurfaced. Further embodiments of the present invention are configured to allow for the gaming table and/or layout to provide content (e.g., multimedia content) during downtime or other intermission periods in game play.

Figure 1:
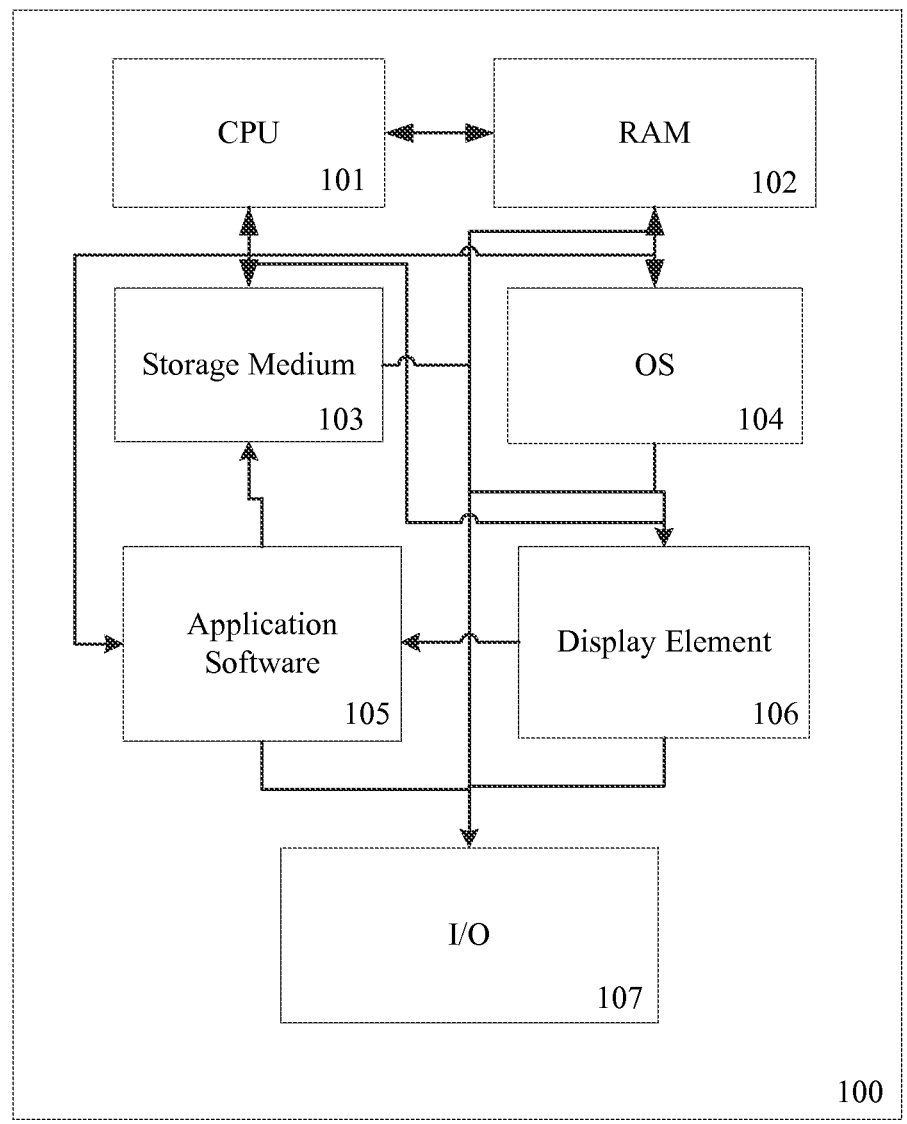
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, a display element 106 and one or more input/output devices/means 107. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

Figure 2:
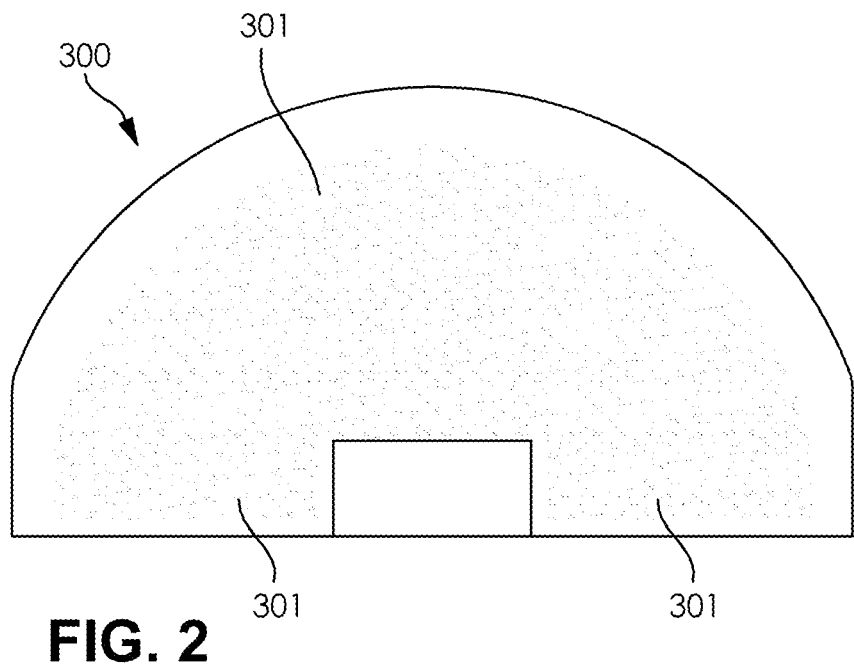
FIG. 2 illustrates an exemplary embodiment of an interchangeable gaming layout in accordance with an embodiment of the present invention.
Figure 3:
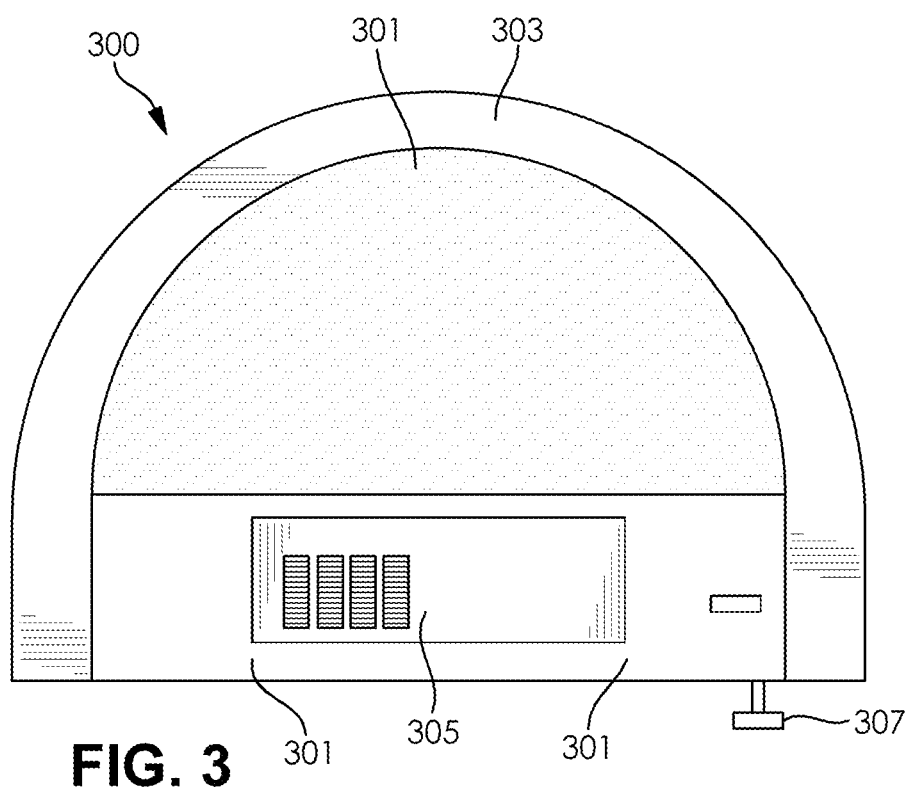
FIG. 3 is a top view of an exemplary embodiment of an interchangeable gaming layout in accordance with an embodiment of the present invention.

According to a preferred embodiment of the present invention, the system may utilize a micro-pc, such as the ARDUINO UNO and a proprietary display element formed in the shape of a standard casino gaming table (See, FIGS. 2 and 3). In a preferred embodiment, the display element can be formed in the shape of any standard casino game table (including, but not limited to, blackjack tables of varying shape, craps tables, baccarat tables, kidney shaped poker tables and roulette tables), any other custom or unique gaming table, or even a traditional board game. In the preferred embodiment, the micro-pc being or other computing device that is being used as the display element controller (or computer controller) may be located at the back of the gaming table so that is accessible by a dealer or other game operator. In alternate preferred embodiments, the display element controller is located at any position on, under, or otherwise attached to the table where it is accessible to the dealer or game operator. As detailed later, communication between the display element and processing components could be multi-directional, allowing for the display element to act as an input device for the computing device. One of ordinary in the art would appreciate there are many possible arrangements for the computing device, and embodiments of the present invention are contemplated for use with any such arrangement.

In an exemplary embodiment according to the present invention, data may be provided to the system, stored by the system and provided by the system to users of the system across local area networks (LANs) or wide area networks (WANs). In a preferred embodiment, the LANs or WANs may be wired or wireless (including, but not limited to WiFi). In accordance with the previous embodiment, the system may be comprised of numerous servers communicatively connected across one or more LANs and/or WANs. For instance, multiple interchangeable gaming layout apparatus could be communicatively connected with processing components (e.g., servers located in a control room at a casino) located remotely from the actual display elements (i.e., gaming tables). One of ordinary skill in the art would appreciate that there are numerous manners in which the system could be configured and embodiments of the present invention are contemplated for use with any configuration.

In general, the methods provided herein may be consumed by the interchangeable gaming layout system whether connected to a network or not. According to an embodiment of the present invention, some of the applications of the present invention may not be accessible when not connected to a network, however an interchangeable gaming layout may be able to compose data offline that will be consumed by other components of the system when the interchangeable gaming layout is later connected to a network.

According to an embodiment of the present invention, an interchangeable gaming layout system is comprised of a display element, a processing element (e.g., micro-PC), and a storage medium configured to store software elements configured to direct the processing element to control the display element for the purpose of displaying one or more types of multimedia content, including, but not limited to, i) a plurality of games (e.g., casino games, blackjack, Spanish 21, poker, roulette, progressive jackpots, board games and other video supported games of chance); ii) advertising content; iii) personalized content; iv) other video or multi-media content; v) side games/bets (e.g., insurance for blackjack, in bets for blackjack, Super Sevens, Royal Match, Bet the Set,) and vi) any combination thereof. The system may further be configured with a human interface device (e.g., keyboard, touchscreen, series of buttons, mouse, controller) configured to allow a user to interact with the system and effect changes where necessary (e.g., select new game type, select content type, perform maintenance). In other embodiments, interface with the system may be done by a remote connection through a communications means (e.g., Bluetooth®, WiFi, Ethernet connection, USB connection, Firewire, Thunderbolt, Near Field Communication (NFC)) to the system.

According to an embodiment of the present invention, an interchangeable gaming layout system may be further comprised of a display element control module. In a preferred embodiment, the display element control module is configured to control which of the one or more types of multimedia content is presented on the display element. In a preferred embodiment, the display element control module facilitates what is presented on the display element by regulating the software elements that control the processing element to display the one or more types of multimedia content. In the preferred embodiment, the display element control module may receive commands directly from an operator that causes the processing element to execute particular a software element. In an alternate preferred embodiment, the display element control module regulates commands that are automatically generated based on an event, including but not limited to, an end of a game, while a table layout is being changed, during pauses in game play (e.g. while a deck of cards is being shuffled), or any other programmed event. In some embodiments, the display element control module is located at the game table, but may receive commands from a remote server or other computing device via a network (e.g. WiFi connection) or wireless connection (e.g. Bluetooth®). In alternate embodiments, the display element control module may be configured to facilitate additional or fewer functions. In a preferred alternate embodiment, the display element control module may also be configured to record data. As an illustrative example, the display element control module may be configured to record the length of time and time of day a particular game is played. One of ordinary skill in the art would appreciate that a display element control module could be configured to accomplish a variety of tasks, and embodiments of the present invention are contemplated for use with any such task.

According to an embodiment of the present invention, the display element and the processing element may be communicatively connected via one or more connection means, such as a printed circuit board allowing for electrical connections between the processing element and the display element. In other embodiments, the display element may be connected to a processing element via a communications transmission means (e.g., CAT5E cable, HDMI cable, wireless connection). In these embodiments, the display element may be further comprised of components capable of translating signals received from the communications transmission means and interpreted into appropriate display data. Further, where the display element is capable of acting as an input device, the display element may have components capable of turning input into signal data to transmit over the communications transmission means to the processing element(s). One of ordinary skill in the art would appreciate that there are numerous methods and components that could be utilized for making the connections between the processing element and the display element, and embodiments of the present invention are contemplated for use with any type of such connection.

According to an embodiment of the present invention, the display element is a dot matrix LED display that is formed in the shape of any standard gaming table (e.g., poker table, blackjack table, craps table, baccarat table, roulette table), a traditional board game (e.g. chess, checkers, Monopoly®, Scrabble®, etc.) or any customized shape required by a new, unique, or nonstandard game or gaming table. For example, customized gaming tables may include, but are not limited to one-off or unique gaming tables that are proprietary to a particular casino or other gaming operator. In a preferred embodiment, the display element covers substantially the entire surface of the gaming table form. This allows for gaming content and other content to be displayed across the entire width and depth of the gaming table or substantially the entire width and depth of the gaming table. In other embodiments, the display element may be comprised of an alternative display element type (e.g., plasma display, liquid crystal display (LCD), AMOLED, organic light emitting diode (OLED)). In a preferred embodiment, the display element may be one single display component. In an alternate preferred embodiment, the display element maybe comprised of multiple individual display components that are being directed by the display element controller to function in unison as a single, cohesive display element. In embodiments with multiple individual display components, each individual display component may attach to a display element attachment point on the display element. When all of the individual display components are attached, a single, cohesive display is formed. One of ordinary skill in the art would appreciate that there are numerous types of display elements that could be utilized with embodiments of the present invention, and embodiments of the present invention are contemplated for use with any type of display element appropriate for the format described herein.

In certain embodiments, the display element may be able to receive input or otherwise detect interaction such that the display element may be an interactive component of the system. In this manner, the display element can perform a variety of functions, including, but not limited to, detecting touches or other interactions of a player, detecting movement of game components (e.g., cheques, chips, cards, dice), reading/scanning data (e.g., game cards, player club cards, driver's licenses), counting chips, determining winning hands, calculating winnings, or any combination thereof. In order to affect this, the display element may be further configured with additional components, including, but not limited to, cameras, resistive touch screens, capacitive touch screens, or any combination thereof. One of ordinary skill in the art would appreciate that there are numerous types of components for receiving input information that could be utilized with embodiments of the present invention, and embodiments of the present invention are contemplated for use with any appropriate input component.

According to an embodiment of the present invention, a top surface of the display element is covered with a surface material configured to allow for the light and content transmitted by the display element to pass through and be visible through the surface material, while providing a tactile sensation similar to that of a standard gaming table/layout. Since there is an intrinsic value to the look and feel of the standard gaming table that players have come to know and enjoy, replicating this feel is an important aspect of certain embodiments of the present invention. Further, for games that require cards, dice or other gaming components, the surface material is utilized to replicate the friction, padding and other physical properties provided by standard gaming table surfaces (e.g., felt). Replicating the properties of the standard gaming table surface helps keep the feel of the game the same for the players (e.g., cards slide the same, dice bounce the same, chips move the same).

According to an embodiment of the present invention, another feature of the surface material must replicate or otherwise approximate a flexibility and/or padding level that is similar to a standard gaming table. The padding level is required to allow for dealers and players the ability to interact with the gaming components (e.g., cards, chips, and dice). Without the appropriate level of padding, players and dealers will have a difficult time lifting, moving or otherwise interacting with the various gaming components. Matching a padding level with the ability to allow images/light from the display element to pass through is crucial to preferred embodiments of the present invention. In other embodiments, the surface material may be more or less flexible than a standard gaming table. The appropriateness of any flexibility level or padding level is generally based upon usability of the table for its intended purpose and embodiments of the present invention are contemplated for use with any appropriate flexibility level or padding level.

According to an embodiment of the present invention, the surface material may be, but is not limited to, fabric, cloth, linen, felt or other suitable material. Clear, transparent or translucent materials may be preferred in order to allow the maximum amount of light from the display element to be transmitted through. One of ordinary skill in the art would appreciate that there are numerous types of materials that could be utilized with embodiments of the present invention, and embodiments of the present invention are contemplated for use with any suitable type of surface material. In a preferred embodiment, the surface material fabric translucency is able to support fine resolution of dot pitch to allow players and dealers to visualize text displayed from the display element through the surface material. Additionally, preferred surface materials will have color, tone and hue to support accurate presentation of colors from the display element.

According to an embodiment of the present invention, the display element may be an OLED display. In a preferred embodiment, the OLED display positioned over top of the surface material. In the preferred embodiment, the OLED display is durable, flexible, and thin enough to allow the properties of the surface material (e.g. padding, flexibility, tactility, etc.) to be felt through the OLED display. One of ordinary skill in the art would appreciate that there are numerous suitable arrangements for the surface material and display element, and embodiments of the present invention are contemplated for use with any such arrangement.

According to an embodiment of the present invention, the display is a dot matrix LED display. In a preferred embodiment, the dot matrix LED display is positioned beneath the surface material. In the preferred embodiment, the surface material allows light from the dot matrix LED display to pass through the surface material so that it can be perceived by a user. One of ordinary skill in the art would appreciate that there are many suitable arrangements for the display element and the surface material and embodiments of the present invention are contemplated for use with any such arrangement.

According to an embodiment of the present invention, various gaming elements may be attached to the interchangeable gaming layout system for use in one or more games. These gaming elements may be secured to the table via a securing means, such as, but not limited to, screws, nuts, bolts, pins, clips, magnets, or any combination thereof. In a preferred embodiment, each of the gaming elements may be configured for quick removal and replacement, in order to allow for quick swapping of games used on the interchangeable gaming layout system.

Figure 7:
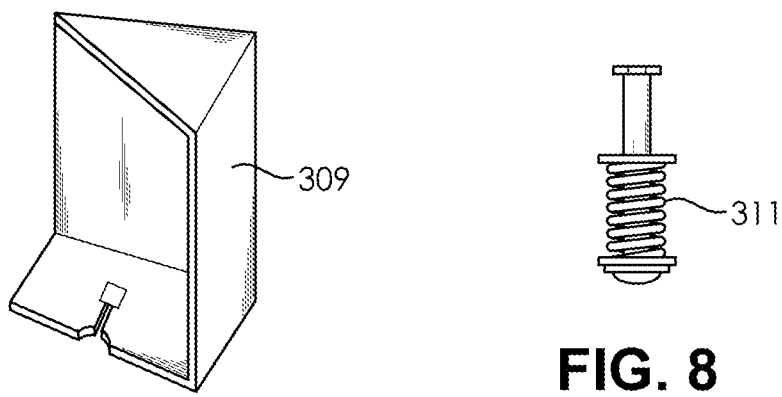
FIG. 7 illustrates an exemplary embodiment of a discard rack of an interchangeable gaming layout in accordance with an embodiment of the present invention.
Figure 8:
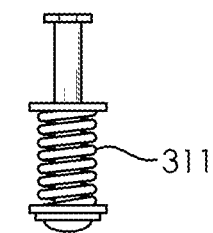
FIG. 8 illustrates an exemplary embodiment of a securing means for attaching different gaming elements to an interchangeable gaming layout in accordance with an embodiment of the present invention.

Gaming elements may include, but are not limited to, card discard racks, card shoes, dice holders, chip holders, or any combination thereof. (See, FIGS. 7, 10, and 11). One of ordinary skill in the art would appreciate there are numerous types of gaming elements that could be utilized with embodiments of the present invention, and embodiments of the present invention are contemplated for use with any type of gaming element.

According to an embodiment of the present invention, the interchangeable gaming layout system may further be comprised of a multi-compartment drop box. The multi-compartment drop box allows the system to provide separate holding compartments for monies received for each game played on the system. In this manner, casinos are provided a method for tracking what games are performing the best by separating out the money into separate compartments. Changing of the multi-compartment drop box may be done manually, such as by a dealer, pit boss or other person. In other embodiments, the processing element of the system may be communicatively connected to the multi-compartment drop box and be configured to automate the switching of compartments depending on what game is selected. Any exemplary embodiment of the multi-compartment drop box can be seen in FIG. 9.

According to an embodiment of the present invention, the multi-compartment drop box can be a manually or electronically controlled attachment that will enable monies collected on the table to be associated with the gaming surface being displayed. It could include an electronic system that is able to identify the denomination and count the currency dropped into it and record on the computer or physically separate the money. The system could use electronics to control and count what money is associated with that game(s) displayed. Alternatively a paper system could be employed to include a written record in the box or other means to monitor cash on the table.

According to an embodiment of the present invention, the interchangeable gaming layout system may further provide a protective layer over the display element to protect the display element from damage (e.g., physical damage from repeated game play, environmental damage from spills or other hazards). In a preferred embodiment of the present invention, the protective layer may be a polycarbonate cover. In the preferred embodiment, the protective layer may feature a padded layer that is intended to help replicate the padded feel of a standard gaming table surface. One of ordinary skill in the art would appreciate that there are numerous types of protective layers that could be utilized with embodiments of the present invention, and embodiments of the present invention are contemplated for use with any type of protective layer.

Exemplary Embodiments

Turning now to FIG. 3, an exemplary embodiment of an interchangeable gaming table layout in accordance with an embodiment of the present invention. In a preferred embodiment, the interchangeable gaming table 300 is comprised of a playing surface 301, a rail cushion 303, a dealer area 305 with a cheques/chips tray, and display element controller 307. The playing surface 301 is covered with a surface material that allows light from the display element to pass through the surface material so that it is visible to persons using the interchangeable gaming table 300. The display element controller 307 is used to control table layout what is displayed on the playing surface 301 of the interchangeable gaming table 300. In the preferred embodiment, all portions of the playing surface 301 are fully customizable, as the display element projects light through the surface material of the interchangeable gaming table 300.

Figure 4A:
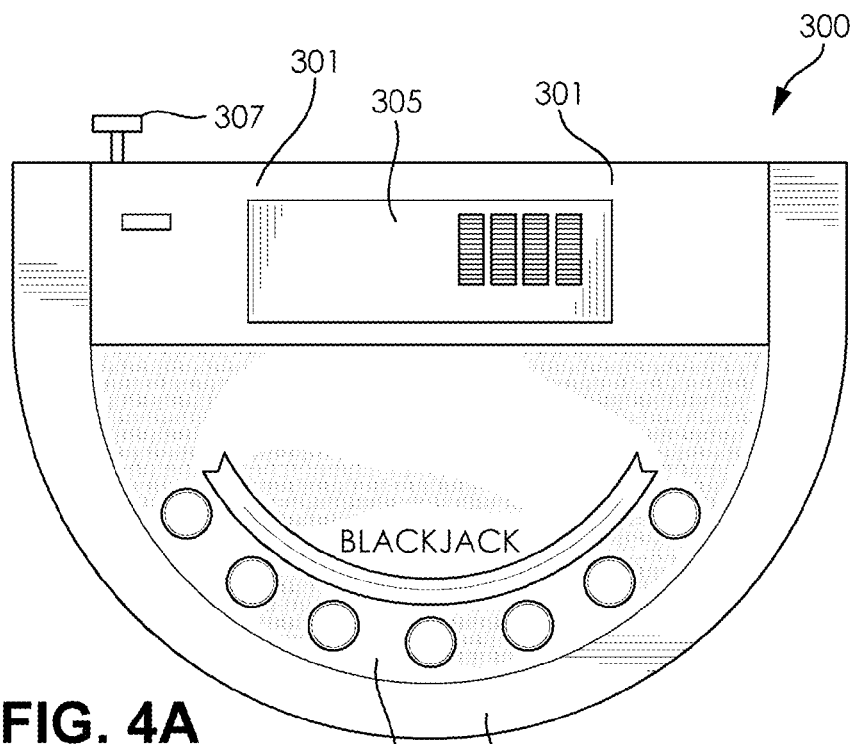
FIGS. 4A-C illustrate various gaming layouts of an interchangeable gaming layout in accordance with an embodiment of the present invention.
Figure 4B:
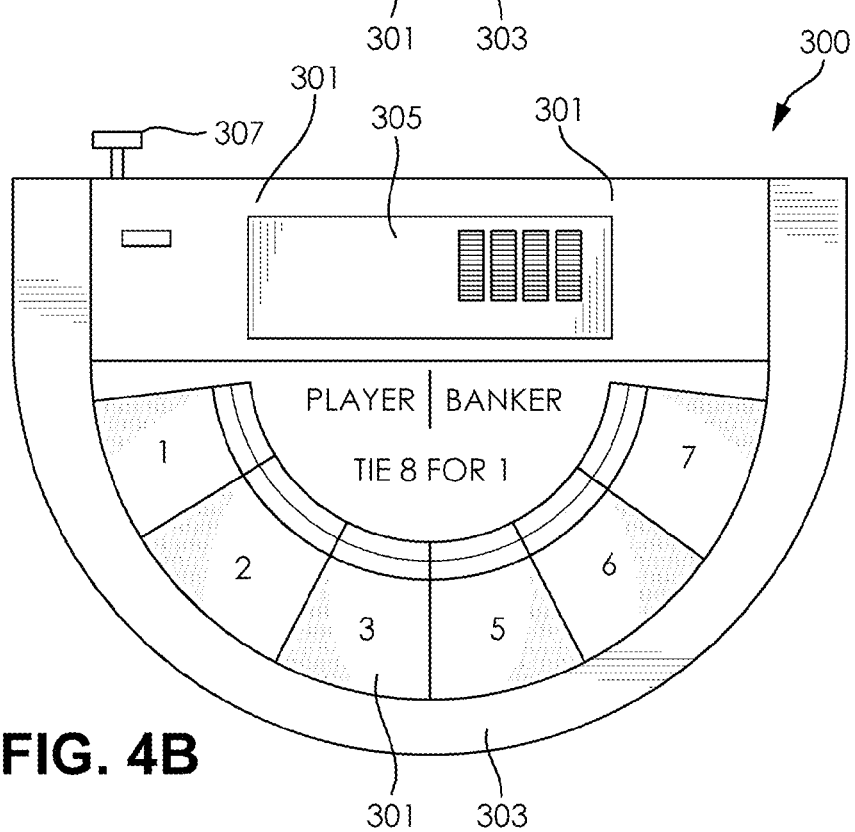
Figure 4C:
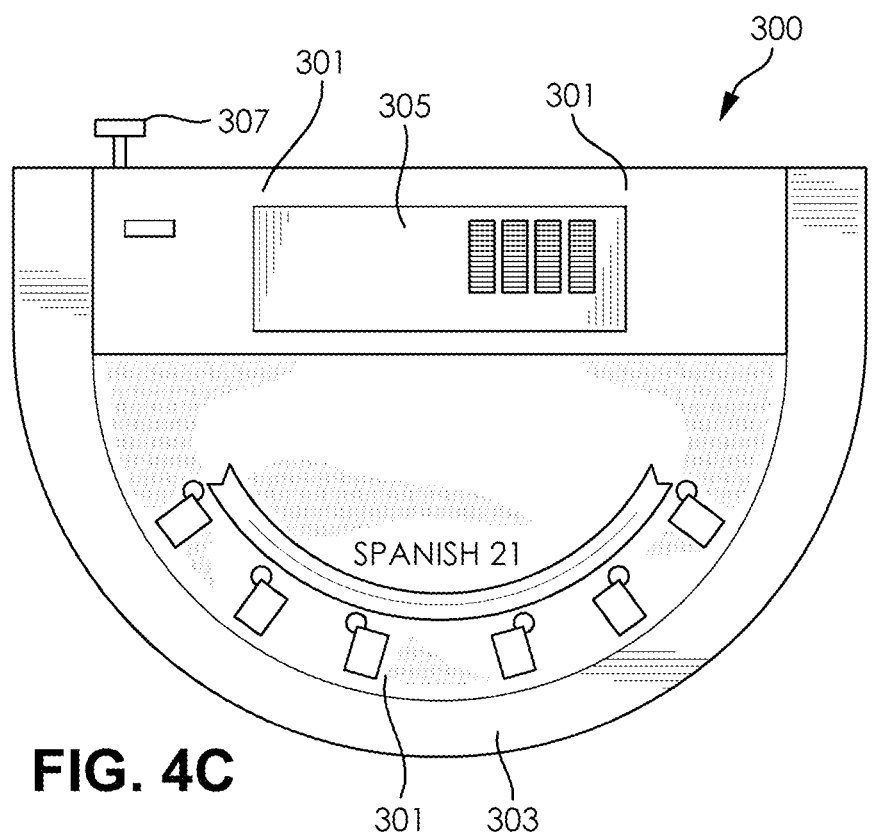

Turning now to FIGS. 4A-C, an exemplary embodiment of possible gaming table layouts for an interchangeable gaming table. In a preferred embodiment, the interchangeable gaming table 300 may be configured with a variety of game layouts including, but not limited to, black jack (FIG. 4A), poker (FIG. 4B), and Spanish 21 (FIG. 4C).

Figure 5:
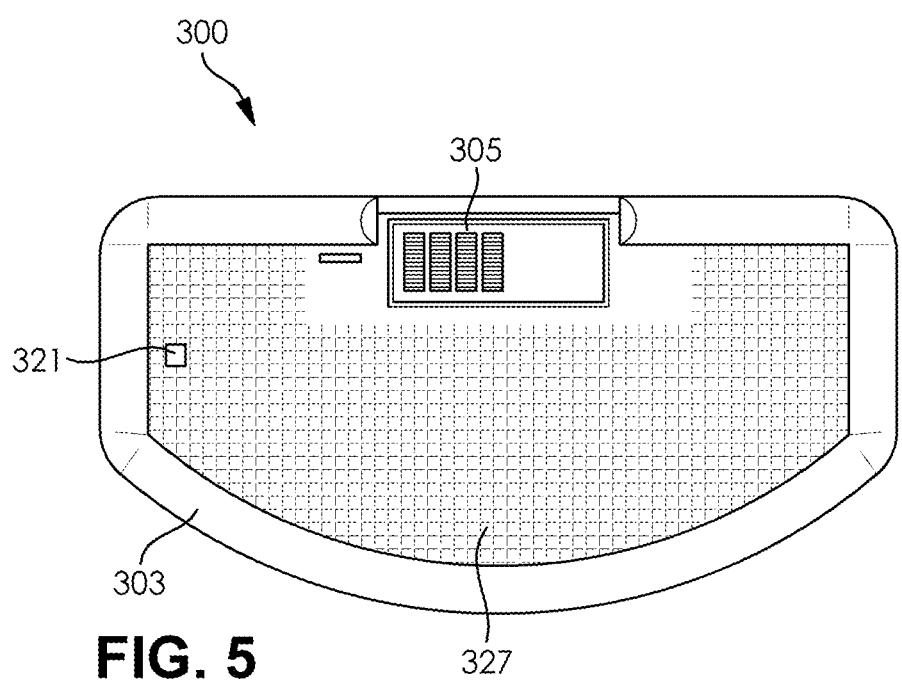
FIG. 5 illustrates a top view of an exemplary embodiment of the display element attachment points of the interchangeable gaming layout in accordance with an embodiment of the present invention.
Figure 6:
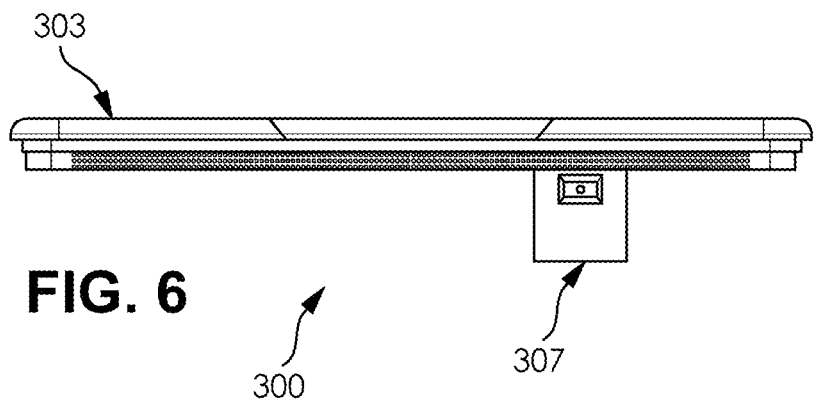
FIG. 6 illustrates a front view of an exemplary embodiment of an interchangeable gaming layout in accordance with an embodiment of the present invention.

Turning now to FIGS. 5 and 6, an exemplary embodiment of an interchangeable gaming table layout in accordance with an embodiment of the present invention. In a preferred embodiment, the interchangeable gaming table 300 is comprised of a playing surface (not shown), a rail cushion 303, a dealer area 305 with a cheques/chips tray, and display element controller 307. In the preferred embodiment, the playing surface is primarily comprised of a surface material (not shown) and a single, cohesive display element. In some embodiments, the display element may be comprised of multiple smaller, individual display components 321 that are connected to corresponding display element attachment points 327. In the preferred embodiment, the display element controller 307 is used to control what is displayed on the playing surface 301 of the interchangeable gaming table 300. In embodiments where the display element is made up of multiple individual display components 321, the display element controller 307 directs the individual display components 321 to function in unison as a single, cohesive display element.

Figure 9:
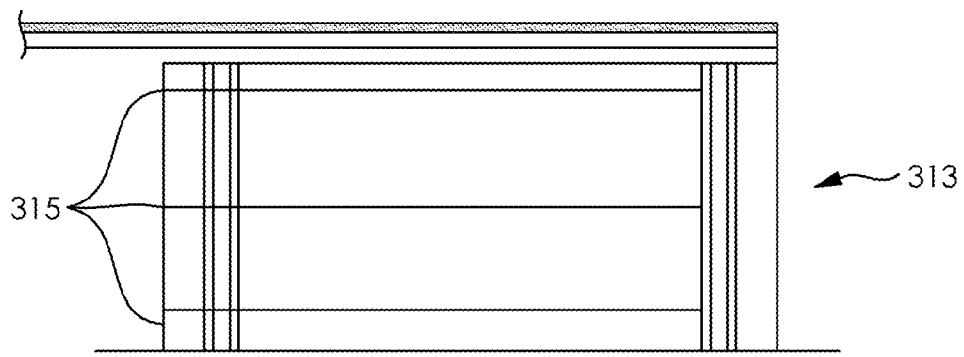
FIG. 9 illustrates an exemplary embodiment of a multi-section drop box for an interchangeable gaming layout in accordance with an embodiment of the present invention.

Turning now to FIG. 9, an exemplary embodiment of multi-section drop box in accordance with an embodiment of the present invention. In a preferred embodiment, the multi-section drop box 313 may be comprised of a plurality of different storage compartments that are divided by a plurality of dividing shelves 315.

Figure 10:
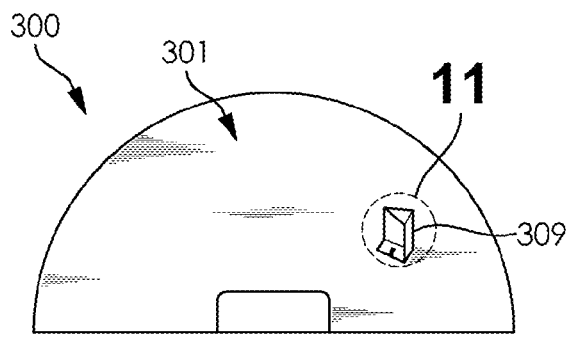
FIG. 10 illustrates an exemplary embodiment of a gaming element attached to the surface of an interchangeable gaming layout in accordance with an embodiment of the present invention.
Figure 11:
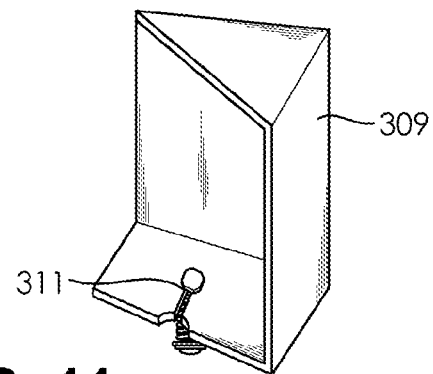
FIG. 11 illustrates an exemplary embodiment of a securing means attaching a gaming element to the surface of an interchangeable gaming layout in accordance with an embodiment of the present invention.

Turning now to FIGS. 10 and 11, an exemplary embodiment of a gaming element on an interchangeable gaming table in accordance with an embodiment of the present invention. In a preferred embodiment, the gaming element 309 (for example, a discard rack) may be attached to the playing surface 301 of the interchangeable gaming table 300 with a securing element 311.

Figure 12:
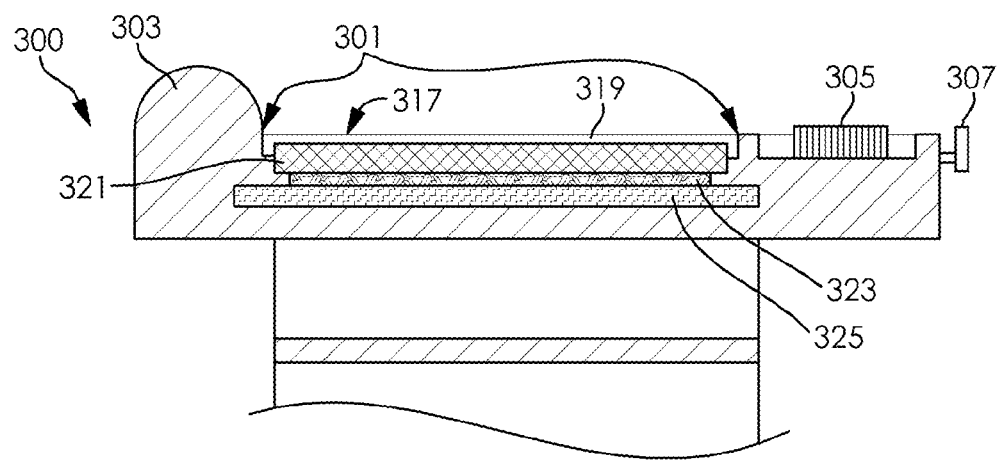
FIG. 12 is cross-sectional view of an exemplary embodiment of an interchangeable gaming layout in accordance with an embodiment of the present invention.

Turning now to FIG. 12, a cross-sectional view of an interchangeable gaming table in accordance with an embodiment of the present invention. In a preferred embodiment, the interchangeable gaming table 300, playing surface 301, rail cushion 303, dealer area 305, display element controller 307, surface material 317, protective layer 319, display element 321, wiring and electrical components 323, and a printed circuit board 325. In the preferred embodiment, the protective layer 319 protects the display element 321 from damage from dust, spills, and harmful impacts, while also allowing light from the display element 321 to pass through the protective layer and into the surface material 317. The surface material 317 is also sufficiently translucent to allow light from the display element 321 to pass through the surface material 317 so that is visible to users of the interchangeable gaming table 300. In the preferred embodiment, the surface material 317 simulates the characteristics of a playing surface of a standard gaming table in various respects including, but not limited to, flexibility, padding level, surface friction, visual appearance, and tactile feel.

FIGS. 3, 4A-C, and 12 further show exemplary embodiments of the present invention, with placements for cheques/chips, cushioned rails, surface material (i.e., felt) and other components. These figures are provided for the purpose of showing an exemplary embodiment and are not meant to be limiting. One of ordinary skill in the art would appreciate that there are numerous configurations of components that could be utilized in accordance with embodiments of the present invention detailed herein.

Methods of Use

According to an embodiment of the present invention, the interchangeable gaming layout system is fully customizable. In a preferred embodiment, the interchangeable gaming layout is fully customizable due to the use of the full color display element. In the preferred embodiment, the display element of the interchangeable gaming layout system is fully customizable and able to display a variety of different graphics and background items, including, but not limited to, the layout for a given game (e.g. player positions, rules, instructions, betting information, etc.), backgrounds (e.g. color of the table), logos and images (e.g. branding information, etc.), advertisements, or any other graphic that might be required by the end user. In some embodiments, the interchangeable gaming layout may be used for traditional board games or any table game that can be supported by video graphics. One of ordinary skill in the art would appreciate there are numerous games that an interchangeable gaming layout could be adapted for, and embodiments of the present invention are contemplated for use with any such game.

According to an embodiment of the present invention, the interchangeable gaming layout system may be used for several different purposes. On top of allowing for the changing of game content between various games and side bets, embodiments of the present invention may be configured to allow for the display of content during intermission events. Intermission events are times when gameplay is halted. Some of these gameplay events occur during regular intervals, such as when a shoe of cards comes to an end and the cards must be reshuffled. Other intermission events may occur on a non-standard basis, such as during the changing of a dealer, changing of a game type, during a break in play (e.g., tournament round end) or during game down time (e.g., no players currently at a table). One of ordinary skill in the art would appreciate that there are numerous types of intermission events that could be detected or identified to the system.

According to an embodiment of the present invention, the interchangeable gaming layout system may utilize intermission events to display non-game related content. Non-game related content may include, but is not limited to, advertising content, branding content, multimedia content, video content, or any combination thereof. For instance, the system may be configured to provide advertisements during intermission events. Advertisements could be, for instance, general advertisements, casino specific advertisements (e.g., restaurants in the casino, events in the casino, gaming information) or any combination thereof. Branding content may include, but is not limited to, videos about a casino, casino logos, casino artwork, or any combination thereof. Furthermore, the branding content would be completely customizable including customizable color schemes, insignias, and patterns that might be used to represent a particular brand. Multimedia content and video content may include, but is not limited to, any other video, audio or other content that the casino would wish to present to users during an intermission event (e.g., TV show, movie, music video).

According to an embodiment of the present invention, the interchangeable gaming layout system may be adapted to provide a customizable player seating layout. In a preferred embodiment, the system provides a seating layout that defines a position or spot for each player. In the preferred embodiment, this layout is customizable in order to adapt to the current demands of the game that is being played. For example, while the standard number of seating positions for a given game might be six (6) positions, the system is able to add additional seating positions as demand for the game increases, thereby allowing a casino or other gaming provider to increase revenue. Conversely, as demand for a game decreases, the system can simply be reverted back to its original or standard number of player positions. In some embodiments, the number of player positions may be decreased below the standard number of positions to accommodate other situations such as high-roller and VIP events or to provide a more comfortable experience to users gaming during low demand periods. One of ordinary skill in the art would appreciate there are many benefits to having a gaming table with an adjustable number of player positions, and embodiments of the present invention are contemplated to take advantage of any such benefits.

According to an embodiment of the present invention, non-game related content may be provided in a targeted manner. Since most table games have defined spots for players (e.g., seats) and players are identified by their seat through player cards or other membership means, specific non-game content may be played that is tailored for these players. In one embodiment, the entire display may be used to play non-game content targeted at one or more users. In other embodiments, the screen can be divided into a section for each player (or identified player) and individualized non-game content can be played for each player individually.

According to an embodiment of the present invention, the interchangeable gaming layout system may identify intermission events either manually, via notification from a dealer or other input (e.g., pit boss, input received from a control room). In other embodiments, the system may be able to automatically identify intermission events and affect the display of non-game content automatically. Automatic identification of intermission events may include detection of a shuffle event, detection of a game switch request or detection of a dealer switch.

For instance, the system may be configured to detect a shuffle event in one or more ways. Firstly, many casinos use automated card shufflers to shuffle decks of cards at the end of a shoe. These automated card shufflers already send a signal (e.g., light emission, signal emission) when shuffling or switching of shoes is started and ended. This shuffle signal can be detected by the system via a sensor element, and utilized to engage and terminate playback of non-game content. For instance, upon the detection of a start of a shuffle event, the system can begin playback of non-game content and terminate playback of non-game content upon detection of an end-of-shuffle event. In other embodiments, proprietary connections to the system may be made (e.g., USB, Firewire, data port) to an automated card shuffler for relay of start and end sequence signals from the automated card shuffler to the system. While this is just one example, one of ordinary skill in the art would appreciate that there are numerous other examples of intermission events that could be detected by the system and used for the start and stop of playback of non-game content.

Exemplary Method

Figure 13:
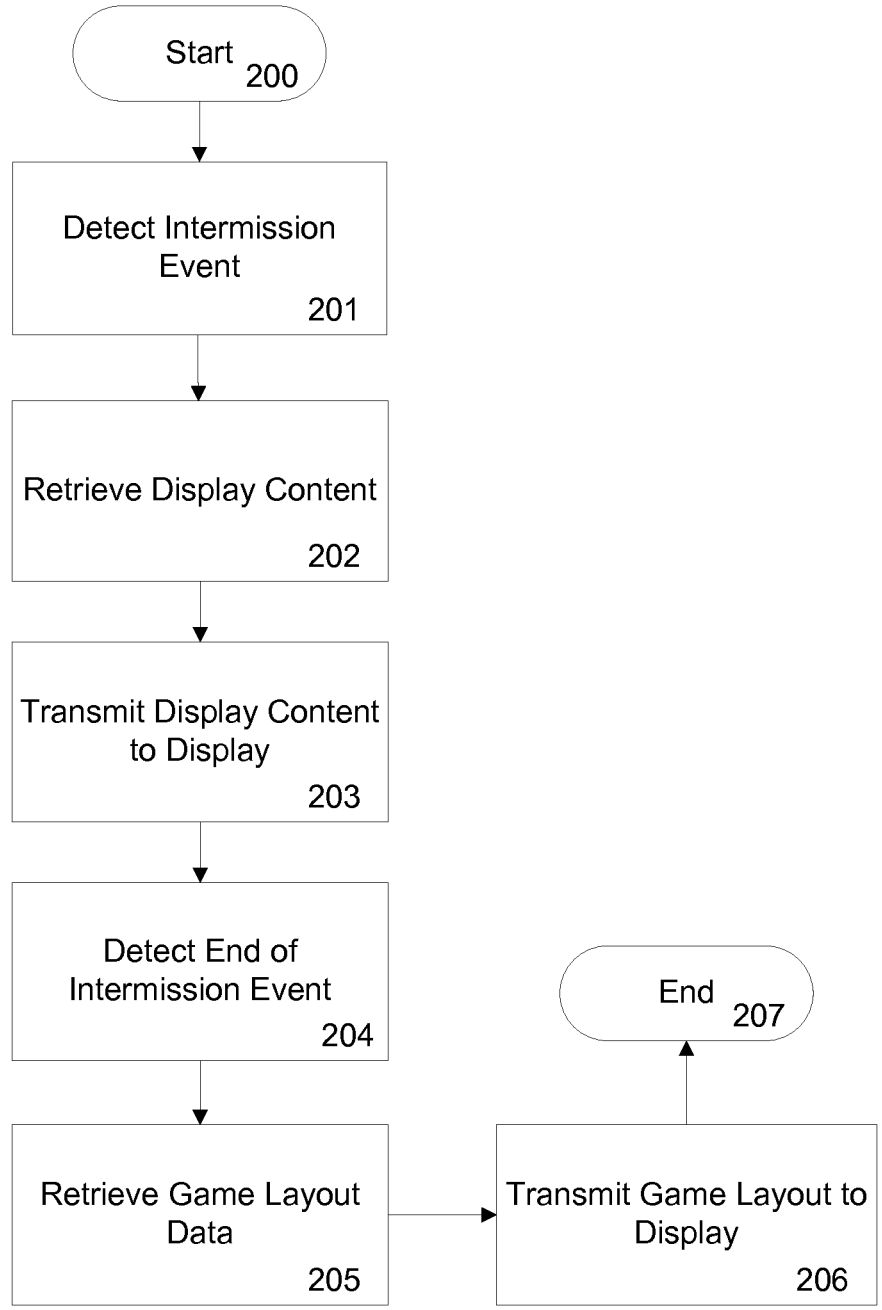
FIG. 13 is an illustration of an exemplary process flow, in accordance with an embodiment of the present invention.

Turning now to FIG. 13, an exemplary embodiment for the playback of non-game content is described. The process starts at step 200, at which time an intermission event occurs. At step 201, the system has detected the intermission event and sets about processing the method detailed herein.

At step 202, the system retrieves content to be displayed by the system on the display element. Generally, this is non-game content as detailed herein. The retrieval may be done from a local storage medium (e.g., hard drive, flash memory, solid state drive), or retrieved from a remote storage system (e.g., remote content server). One of ordinary skill in the art would appreciate there are numerous methods for the storage and retrieval of non-game content, and embodiments of the present invention are contemplated for use with any appropriate method for content retrieval.

At step 203, the system transmits the content to the display element for consumption by players or others in the vicinity of the display element. At some later time, the system detects an end-of-intermission event signal (step 204). At this point, the system retrieves the game layout data (e.g., game display information data) (step 205). The game layout data may be retrieved from a local storage medium or remote storage system. Similar to the non-game content, there are numerous methods for processing this retrieval.

At step 206, the system transmits the game layout data/information data to the display element and the game is displayed on the display element. At this point the process terminates at step 207 and the players can begin playing the game as usual.

While embodiments herein have been focused on usage in casinos, embodiments of the present invention could be used in any setting, including home use, usage in restaurants, bars or other entertainment facilities or any other setting.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages.

Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for an interchangeable gaming layout, the system comprising:
   one or more light emitting display panels communicatively connected to a processing element, wherein each of said one or more light emitting display panels has a light emitting surface portion that displays gaming table graphics;
   a storage medium configured to store software elements, wherein said software elements are computer executable code stored in non-volatile memory that control the display of said gaming table graphics and are executable by said processing element to direct what is displayed on said one or more light emitting display panels; and
   a padding layer covering abutting said light emitting surface portion of said one or more light emitting display panels; and
   a felt cloth material covering and abutting said padding layer, wherein said gaming table graphics are visible through said felt cloth material.

2. The system of claim 1, wherein said one or more light emitting display panels form a gaming table playing surface.

3. The system of claim 2, wherein said gaming table playing surface has a shape that is selected from a group of gaming table shapes comprising poker tables, baccarat tables, blackjack tables, craps tables, board games, non-standard tables, and custom tables.

4. The system of claim 1, wherein said gaming table graphics comprise one or more of table layouts, player positions, logos, backgrounds, and one or more types of multimedia content.

5. The system of claim 4, wherein said one or more types of multimedia content are selected from a plurality of multimedia types comprising a plurality of games, advertising content, personalized content, video content, betting information, table rules, and side games.

6. The system of claim 1, further comprising one or more gaming elements attached to the interchangeable gaming layout, wherein said one or more gaming elements are selected from a group of gaming elements comprising card discard racks, card shoes, dice holders, and chip holders.

7. The system of claim 6, further comprising one or more securing means configured to reversibly attach said one or more gaming elements to the interchangeable gaming layout, wherein said one or more securing means are selected from a group of securing means comprising screws, nuts, bolts, clips, magnets, and pins.

8. The system of claim 1, further comprising a multi-compartment drop box configured to provide a plurality of separate holding compartments for monies received from a plurality of different game types.

9. The system of claim 1, wherein each of said one or more light emitting display panels is selected from a group of light emitting display types comprising dot matrix LED displays, plasma displays, liquid crystal displays (LCD), and organic light emitting diode displays.

10. The system of claim 1, wherein a plurality of LED lights are embedded in said light emitting surface portion of said light emitting display panels.

11. The system of claim 10, wherein said light emitting surface panels are flexible.

12. The system of claim 1, wherein said felt cloth material provides a friction and tactile feel that is that equivalent to standard gaming table felt.

13. The system of claim 2, wherein said padding layer provides said gaming table playing surface with flexibility that is equivalent to a standard gaming table playing surface.

14. A system for an interchangeable gaming layout, the system comprising:
   one or more LED display panels that form a gaming table playing surface and are communicatively connected to a processing element, wherein said LED display panels display gaming table graphics;
   a padding layer covering and abutting said gaming table playing surface; and
   a felt cloth material covering and abutting said padding layer, wherein said gaming table graphics are visible through said felt cloth material;
   a storage medium configured to store software elements, wherein said software elements are computer executable code stored in non-volatile memory that control the display of said gaming table graphics and are executable by said processing element to direct what is displayed on said gaming table playing surface.

15. A system for an interchangeable gaming layout, the system comprising:
   one or more light emitting display panels communicatively connected to a processing element, wherein each of said one or more light emitting display panels has a light emitting surface portion that displays gaming table graphics;
   a storage medium configured to store software elements, wherein said software elements are computer executable code stored in non-volatile memory that control the display of said gaming table graphics and are executable by said processing element to direct what is displayed on said one or more light emitting display panels;
   a padding layer covering and abutting said light emitting surface portion of said one or more light emitting display panels;
   a felt cloth material covering and abutting said padding layer, wherein said gaming table graphics are visible through said felt cloth material; and
   a multi-compartment drop box configured to provide a plurality of separate holding compartments for monies received from a plurality of different game types.

* * * * *